Nov. 20, 1962  A. H. LIERS  3,064,466
DETECTION OF LEAKS IN SEALED UNITS
Filed Feb. 6, 1959

INVENTOR.
ARTHUR H. LIERS
BY
ATTORNEYS 3,064,466
DETECTION OF LEAKS IN SEALED UNITS
Arthur H. Liers, North Bellemore, N.Y., assignor to Acoustica Associates, Inc., Mineola, N.Y., a corporation of New York
Filed Feb. 6, 1959, Ser. No. 791,565
3 Claims. (Cl. 73—45.5)

This invention relates to the detection of leaks in sealed units.

In many fields of manufacture, units are housed in sealed containers, and it is desirable to test the effectiveness of the seal before shipping the units. Examples are gas meters; relays, switches, level sensors and electric meters which are protectively housed in sealed containers; and varied devices such as servo units and packaged electronic circuits. These are usually gas filled with an appropriate inert gas, but the present invention is not limited to gas filled units, and instead may be used also with units sealed in containers which are filled with oil or other appropriate liquid. Examples of such oil filled units are electrical condensers, inductors, transformers, etc.

The primary objects of the present invention are to generally improve the testing of such units for the detection of leaks, and to provide a method which is non-destructive and non-injurious to properly sealed units, but which will definitely and quickly expose the presence of even a minute leak.

In accordance with the present invention, a unit to be tested is immersed in a liquid, usually water having a wetting or cleaning agent; the pressure inside the unit is increased somewhat; and the liquid is agitated at a frequency in the range of high sonic and ultrasonic frequencies. For brevity and convenience I shall hereinafter refer simply to ultrasonic frequencies. The pressure inside the unit is most readily raised by maintaining the liquid at a temperature which is higher than the temperature of the unit when it was sealed, but in some cases, as when the unit has a pipe connection, a direct pressure may be applied.

I have found that the ultrasonic agitation of the liquid reveals imperfections much more dependably and quickly than would be the case in the absence of the ultrasonic agitation. It helps dislodge a contaminant which may be temporarily masking a pin hole or porosity.

To accomplish the foregoing general objects, and other more specific objects which will hereinafter appear, my invention resides in the process steps and their relation one to another, as are hereinafter more particularly described in the following specification. The specification is accompanied by a drawing in which.

Figure 1:
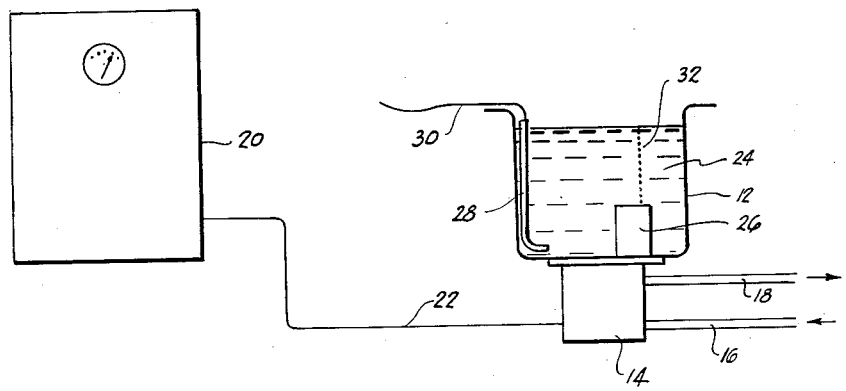
FIG. 1 is a schematic view illustrating the invention in one form.

Referring to the drawing, and more particularly to FIG. 1, the apparatus may be of a known and commercially available type comprising a tank 12 provided with an electroacoustic transducer 14, which in the present case is located at the bottom of the tank. The transducer may be water jacketed and cooled by water flowing through supply and return pipes 16 and 18, and it is energized by electrical energy supplied from a suitable high frequency generator 20. The generator 20 excites the transducer 14 through an electrical cable schematically represented by line 22. Typical frequencies available in commercial apparatus for this purpose are 25 kc. and 40 kc. both of which are ultrasonic and therefore desirable in order to avoid objectionable noise.

The tank 12 contains water 24, preferably having a detergent or other wetting agent added thereto. A sealed unit which is to be tested is indicated at 26, and in practice a group of such units may be placed in the tank simultaneously. Pressure inside unit 26 is most simply raised by raising the temperature. Ordinarily this is done by maintaining the liquid 24 at a temperature higher than the temperature of the unit 26 when it was sealed, which usually is room temperature. For this purpose an immersion heater 28 may be provided, this being energized through a suitable electric power supply line 30, but the temperature may be raised in any desired fashion. A suitable temperature for many products in 120° F.

The presence of even a minute pinhole or porosity will be revealed by rising bubbles, here indicated at 32, and these are readily visible to the naked eye. This is so despite the agitation of the liquid 24, even to the extent of cavitation with bubbles, because cavitation bubbles are different in appearance and behavior, and are readily distinguishable from a stream of leakage bubbles.

In the case of an oil filled unit an emulsified stream rises at the point 32, and also is readily visible to the naked eye.

Figure 2:
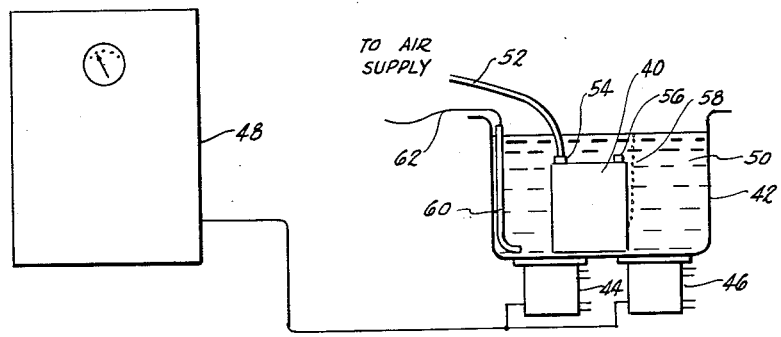
FIG. 2 is a schematic view illustrating the invention in another form.

Referring now to FIG. 2, the process there is shown applied to the testing of a gas meter 40. One or more such meters are immersed in a tank 42 of suitable dimension, and this being larger, may be provided with a plurality of electro acoustic transducers indicated at 44 and 46. These are energized from a common source 48, in accordance with known techniques which are already used in cleaning apparatus. As before, the liquid 50 in the tank is preferably water with a detergent or wetting agent.

The present process differs primarily in the method of raising the pressure inside the meter 40. This is done by applying compressed air or gas to the meter through a pipe 52 connected to one of the regular meter connections 54, the other connection 56 being plugged or stoppered. As before, a leak will be revealed by a stream of bubbles rising from the unit, as indicated at 58.

In actual practice it is found desirable to raise the temperature of the liquid even in the process shown in FIG. 2, and for this purpose an immersion heater 60 may be provided, energized through a cable 62. By way of example, I have employed a temperature of 120° F. and an air pressure of one pound. Experiment has shown that this process reveals leaks which are not detected when the transducers 44 and 46 are not energized. Such leaks have been exposed in less than one minute.

The liquid used may consist of water with alcohol instead of a detergent. Alcohol may be used without water. Other liquids may be used such as trichlorethylene, perchlorethylene, and a cleaning solution using a kerosene base and which is sold commercially under the trade name "Varsol." In general, the idea is to use a solvent or cleaning agent or detergent which is effective to help release the contaminants on the units being tested. In one case it may be grease. In another it may be scale. In another it may be a flux.

The vibration frequency used to agitate the liquid may range from 10 kc. to 1 mc., but for convenience and peak efficiency I recommend a range of from 20 kc. to 40 kc. Frequencies below 20 kc. are less desirable because of the noise effect on operating personnel. At frequencies above 40 kc. there is a loss of ultrasonic cavitation, which detracts from the efficiency of the process.

The transducers may be of either the piezo or the magnetostrictive type. Transducers and generators operating at 25 kc. and at 40 kc. have proved to be highly effective.

I have used a DR 2000AL generator made by Acoustica Associates Inc. of Mineola, New York, with magnetostrictive transducers, at a frequency of 25 kc., which has proven highly effective. This generator is composed of a modified Colpitts oscillator with full wave output. An amplifier stage is used to step up the output to a full two kilowatts of average power, with a peak power of eight kw. This output is of the pulsed type. Both stages use the stepped up 220 volt, 60 cycle line frequency as plate voltage, which modulates the output.

I have also effectively used the DR 125AH oscillator of the same company, with barium titanate transducers, at a frequency of 40 kc. The DR 125AH generator is a modified Hartley oscillator delivering 125 watts of average power, with peak power of 500 watts, at the frequency of 40 kc. The output is full wave, with a stepped up 115 volt, 60 cycle line frequency being used to modulate the output.

It is believed that the method and the advantages of my invention will be apparent from the foregoing detailed description. The ultrasonic agitation and cavitation of the liquid forces the wetting agent into minute crevices, so that any defect in the seal which is temporarily masked by weak or foreign material at the site, is exposed by blasting loose of the masking material, thereby exposing the defect immediately, instead of it being concealed and causing more serious harm and greater trouble at a later date.

It will be apparent that while I have shown and described my invention in preferred forms, changes may be made in the methods disclosed without departing from the scope of the invention, as sought to be defined in the following claims. In the claims the term "cleaning agent" is intended to include wetting agents, chemical and hydrocarbon solvents, detergents etc.

I claim:

1. The method of detecting leaks in a sealed unit capable of containing a fluid, which includes immersing said unit in a liquid bath, engendering a positive fluid pressure inside said unit, and applying elastic wave energy to said bath at an intensity level substantially sufficient to bring about cavitation of said bath, to apply vibrational energy to said unit indirectly through the liquid bath and thereby to promote the escape of fluid through any leak which may exist in said unit.

2. The method of detecting leaks in a sealed unit capable of containing a fluid, which includes immersing said unit in a liquid bath having a wetting agent, engendering a positive fluid pressure inside said unit, and applying elastic wave energy to said bath at an intensity level substantially sufficient to bring about cavitation of said bath, to apply vibrational energy to said unit indirectly through the liquid bath and force the wetting agent into crevices which may exist in the outer surface of said unit, and thereby to promote the escape of fluid through any leak which may exist in said unit.

3. The method of detecting leaks in a sealed unit capable of containing a fluid, which includes immersing said unit in a liquid bath, engendering a positive fluid pressure inside said unit, and applying elastic wave energy at a frequency in the range of from 20 kc./sec. to 40 kc./sec. to said bath at an intensity level substantially sufficient to bring about cavitation of said bath, to apply vibrational energy to said unit indirectly through the liquid bath and thereby to promote the escape of fluid through any leak which may exist in said unit.

References Cited in the file of this patent

UNITED STATES PATENTS

| | | |
|---|---|---|
| 1,370,437 | Gustafson | Mar. 1, 1921 |
| 1,995,699 | Baker et al. | Mar. 26, 1935 |
| 2,316,842 | Coleman | Apr. 20, 1943 |
| 2,856,538 | Switzer | Oct. 14, 1958 |
| 2,961,869 | Bagno | Nov. 29, 1960 |